United States Patent
Penzkofer

(10) Patent No.: US 10,151,252 B2
(45) Date of Patent: Dec. 11, 2018

(54) CONTROL VALVE FOR AN EXHAUST SYSTEM AND AN EXHAUST SYSTEM HAVING SUCH A CONTROL VALVE

(71) Applicant: Klaus Penzkofer, Pilling (DE)

(72) Inventor: Klaus Penzkofer, Pilling (DE)

( * ) Notice: Subject to any disclaimer, the term of this patent is extended or adjusted under 35 U.S.C. 154(b) by 88 days.

(21) Appl. No.: 15/098,527

(22) Filed: Apr. 14, 2016

(65) Prior Publication Data

US 2016/0305347 A1 Oct. 20, 2016

(30) Foreign Application Priority Data

Apr. 14, 2015 (DE) .................... 20 2015 101 816 U

(51) Int. Cl.
| | | |
|---|---|---|
| *F02D 9/04* | (2006.01) | |
| *F16K 5/06* | (2006.01) | |
| *F01N 1/00* | (2006.01) | |
| *F16K 27/06* | (2006.01) | |
| *F01N 1/16* | (2006.01) | |
| *F01N 13/08* | (2010.01) | |

(52) U.S. Cl.
CPC ............... *F02D 9/04* (2013.01); *F01N 1/00* (2013.01); *F01N 1/165* (2013.01); *F01N 13/08* (2013.01); *F16K 5/0605* (2013.01); *F16K 5/0647* (2013.01); *F16K 27/067* (2013.01); *F01N 2240/36* (2013.01); *F01N 2260/10* (2013.01); *F01N 2260/14* (2013.01); *F01N 2310/02* (2013.01)

(58) Field of Classification Search
CPC ........ F02D 9/04; F16K 27/067; F16K 5/0605; F16K 5/0647; F01N 13/08; F01N 1/00; F01N 1/165; F01N 2260/10; F01N 2240/26; F01N 2260/14; F01N 2310/02
See application file for complete search history.

(56) References Cited

U.S. PATENT DOCUMENTS

| | | | | |
|---|---|---|---|---|
| 4,253,640 | A | * 3/1981 | Priese | ................... F16K 5/0647 251/161 |
| 4,651,775 | A | 3/1987 | Okada | |
| 5,104,092 | A | * 4/1992 | Block | ................... F16K 27/067 251/152 |

(Continued)

FOREIGN PATENT DOCUMENTS

| | | |
|---|---|---|
| DE | 18 29 236 U | 4/1961 |
| DE | 196 51 499 A1 | 6/1998 |

(Continued)

OTHER PUBLICATIONS

German Search Report dated Apr. 14, 2015 (4 pgs.).

(Continued)

*Primary Examiner* — Marina Tietjen
(74) *Attorney, Agent, or Firm* — Cook Alex Ltd.

(57) ABSTRACT

A control valve (10) for an exhaust system of a motor vehicle, especially a motorbike, comprising a valve housing (11) in which a shut-off body (12) is movably arranged for changing the cross-section of a flow channel (21) of the exhaust system, wherein expansion play in the radial and axial direction is provided between the shut-off body (12) and the valve housing (11), which allows thermal expansion of the shut-off body (12) within the valve housing (11), wherein the shut-off body (12) comprises a perforated ball (12a).

19 Claims, 3 Drawing Sheets

(56) References Cited

U.S. PATENT DOCUMENTS

| | | | |
|---|---|---|---|
| 5,277,404 A * | 1/1994 | Andersson | F16K 5/0647 |
| | | | 251/315.06 |
| 5,758,689 A * | 6/1998 | Leinen | F16K 47/045 |
| | | | 137/625.32 |
| 5,866,860 A | 2/1999 | Chen | |
| 2001/0027648 A1 | 10/2001 | Nakayasu et al. | |
| 2002/0179165 A1 * | 12/2002 | Hu | F16K 31/04 |
| | | | 137/870 |
| 2011/0132337 A1 | 6/2011 | Lupescu et al. | |
| 2014/0190161 A1 | 7/2014 | Hayashi | |
| 2014/0338313 A1 | 11/2014 | Wollants et al. | |

FOREIGN PATENT DOCUMENTS

| | | |
|---|---|---|
| DE | 10235997 A1 | 2/2004 |
| DE | 20 2010 012 100 U1 | 2/2011 |
| FR | 2 757 569 A1 | 6/1998 |
| JP | S62 178 764 A | 8/1987 |
| JP | 3701297 B1 | 9/2005 |

OTHER PUBLICATIONS

European Patent Office, European Search Report, counterpart EP 16164217.8, dated Aug. 10, 2016, with computer generated Google Translation in English.

* cited by examiner

CONTROL VALVE FOR AN EXHAUST SYSTEM AND AN EXHAUST SYSTEM HAVING SUCH A CONTROL VALVE

The invention relates to a control valve according to the preamble of claim 1. The invention further relates to an exhaust system for a motor vehicle with such a control valve. A control valve of the kind mentioned above is known for example from DE 20 2010 012 100 U1.

A flap disc is arranged in the known control valve within a valve housing, which disc forms a shut-off body. The flap disc is rotatably mounted so that a changing cross-section of the flow channel extending through the control valve is adjustable. The flap disc is arranged in the valve housing in such a way that a thermally induced expansion of the flap disc in the radial direction does not block the rotational movement of the flap disc. Thermal expansion play is thus provided between the valve housing and the flap disc.

It is disadvantageous in the known control valve that the flap disc is also situated in the flow channel in the open state. This leads to turbulence in the exhaust gas flow which can be undesirable. Furthermore, particulates can accumulate on the flap disc, which despite the originally provided thermal expansion play can impair a rotation or sealing contact of the flap disc on the seal seat.

It is the object of the invention to provide a control valve for an exhaust system of a motor vehicle which requires little maintenance and ensures reliable functionality. It is further the object of the invention to provide an exhaust system for a motor vehicle with such a control valve.

This object is achieved in accordance with the invention with respect to the control valve by the subject matter of claim 1 and with respect to the exhaust system by the subject matter of claim 16.

The invention thus proposes to provide a control valve for an exhaust system of a motor vehicle, especially a motorbike, wherein the control valve comprises a valve housing in which a shut-off body is movably arranged for changing the cross-section of a flow channel of the exhaust system. Expansion play in the radial and axial direction is provided between the shut-off body and the valve housing, which expansion play allows a thermal expansion of the shut-off body within the valve housing. It is provided that the shut-off body comprises a perforated ball.

The control valve is therefore substantially formed in the manner of a ball valve, wherein a ball provided with at least one through bore is provided as a shut-off body. The perforated ball substantially forms a ring rotatable about a rotational axis, wherein the rotational axis preferably extends radially through the ring or the perforated ball. The ring has a spherical outer circumferential surface. The inner circumferential surface of the perforated ball or the at least one through bore can have a cylindrical shape.

The use of a perforated ball as a shut-off body ensures that the cross-section of the flow channel can be released completely. In particular, it is prevented by the control valve in accordance with the invention that components can protrude into the flow channel in the fully open state of the control valve or the shut-off body. Undesirable turbulence in the flow channel is thus prevented. In the case of the shut-off body formed as a ball with at least one through bore, there is a lower risk that particulates will accumulate, which obstruct or hinder a rotational movement of the shut-off body. This ensures reliable functionality. The control valve in accordance with the invention is further characterized by especially good ease of maintenance. In particular, access to the adjacent pipe sections is facilitated by free access through the fully open control valve.

In a preferred embodiment of the control valve in the accordance with the invention, the shut-off body, and the perforated ball in particular, comprises one or several through bores. It is generally advantageous if the shut-off body comprises a single through bore whose cross-section preferably corresponds to the inner cross-section of adjoining exhaust pipe sections. It is principally also possible to provide the ball with several through bores. The ratio between the flow cross-section and the valve position can advantageously be adjusted on the basis of a greater number of through bores.

The valve housing is preferably formed in several parts. This facilitates the production of the control valve. The valve housing can especially be formed in two parts, so that the shut-off body can easily be inserted between the two valve housing parts during mounting of the shut-off body.

The valve housing and/or the shut-off body can comprise solid material or be produced therefrom. The use of a solid material facilitates production and leads to high stability of the control valve. It can alternatively be provided that the valve housing and/or the shut-off body have a hollow material or are formed therefrom. The use of a hollow material offers the advantage to provide the lightest possible construction. Furthermore, the hollow material can form a resonant body so that desired noise generation is promoted.

The valve housing preferably comprises a middle cylindrical section and two adjoining sections formed in the manner of a truncated cone. This formation of the valve housing facilitates mounting of the control valve within an exhaust pipe or an exhaust system. The control valve is generally preferably formed in such a way that can be mounted in an exhaust pipe or between two exhaust pipes of an exhaust system. The shape of the exhaust pipes can be substantially cylindrical, but alternatively also generally polygonal.

The shut-off body is preferably connected to an actuating shaft or formed in an integral manner with said shaft. The actuating shaft can extend in preferred embodiments through an opening in the valve housing to the outside. The actuating shaft is advantageously used to rotate the shut-off body within the valve housing. For this purpose, the actuating shaft can be coupled to a mechanical drive device such as a lever or a cable pull. It is also possible that the actuating shaft is coupled to an electronically controlled controlling device. In particular, the actuating shaft can be connected to an electric servomotor so that the position of the shut-off body is adjustable by actuating the servomotor.

It can be provided for the further simplification of the production of the control valve that the opening for the actuating shaft is arranged in the cylindrical section of the valve housing. The opening can be integrated in an especially simple way in this section. It can be provided in particular that the valve housing is divided into two parts in the cylindrical section, wherein the dividing line between the two cylinder halves of the valve housing is oriented in the circumferential direction and also divides the opening. In other words, both cylinder halves each comprise a semicircular half of the opening, wherein the opening is assembled in a circular way by joining the cylinder halves of the valve body. The shut-off body can thus be integrated easily in the valve housing and the actuating shaft can be guided through the valve housing to the outside at the same time.

It is generally provided that the actuating shaft and the shut-off body have the same material. In particular, the actuating shaft and the shut-off body can be formed in an integral manner. It can alternatively be provided that the actuating shaft and the shut-off body comprise different materials. The actuating shaft can thus be made of stainless steel for example, whereas the shut-off body comprises a ceramic material for example. The actuating shaft can be rigidly cast into the ceramic material of the shut-off body so that the actuating shaft generally forms a uniform component with the shut-off body.

It is provided in a further preferred embodiment of the control valve in accordance with the invention that the valve housing comprises at least one bypass channel. The bypass channel allows an exhaust gas flow irrespective of the position of the shut-off body. The bypass channel is advantageously arranged parallel to the through bore in the shut-off body. The bypass channel can be aligned in relation to the same exhaust pipe which adjoins the shut-off body. It is alternatively possible that the bypass channel is assigned to a further flow channel which is independent of the flow channel in which the shut-off body is arranged.

At least one seal, especially a metallic seal, can be arranged between the valve housing and the shut-off body. The seal ensures that a complete closure of the flow channel is achieved in the closed state of the shut-off body. The use of a metallic seal is advisable due to the high thermal loads in an exhaust system.

A further embodiment of the invention provides that the shut-off body is arranged in a floating manner in the valve housing, especially spaced on all sides from the valve housing. Preferably, the distance between the shut-off body and the valve housing is between 0.2 mm and 1.3 mm, preferably between 0.5 mm and 1.0 mm. It is not excluded that a seal is arranged in said gap which is provided between the valve housing and the shut-off body. The gap ensures that the shut-off body is easily rotatable even in the case of thermally caused radial expansion. As a result, expansion play is provided by the distance between the shut-off body in the valve housing. Jamming of the shut-off body is thus prevented.

Notice must be taken in this connection that for using the control valve in an exhaust system absolute tightness in the closed state of the shut-off body is not mandatorily required. As a result, a seal between the shut-off body in the valve housing can be omitted. It is the relevant task of the control valve to vary the volumetric flow of the exhaust gas, but not to completely prevent said flow.

In preferred embodiments of the invention, the valve housing comprises at least one bearing for the shut-off body and/or the actuating shaft. In particular, sleeve bearings or flanged sleeve bearings can be provided which facilitate the rotation of the shut-off body in the valve housing.

In order to limit the rotational movement of the shut-off body, a limit stop can further be provided. The limit stop can be arranged on the valve housing and/or on the shut-off body. The limit stop is preferably formed in such a way that it only limits the rotational movement of the shut-off body, but it does not fulfil any further functions. It is especially provided that that the limit stop is free from any sealing function, i.e. it does not form any seal seat.

At least one spring element can further be provided in the control valve in accordance with the invention, which spring element acts on a rotational movement and/or a displacing movement of the shut-off body in the longitudinal axial direction of flow, so that the shut-off body can be returned to a predetermined starting position. In other words, the shut-off body can be spring-loaded, so that it is returned as a result of the spring force of the spring element to a starting position, preferably the completely closed position. The opening of the shut-off body preferably occurs against the spring force of the spring element.

Notice must be taken in general that the control valve in accordance with the invention is not only suitable for use in an exhaust system. Instead, the control valve formed according to the principle of a ball valve can also be used for flow paths in fuel lines, lines for operating supplies, intake air lines, venting lines or coolant lines of a motor vehicle, preferably a motorbike. The control valve in accordance with the invention is especially used in motorised vehicles which comprise an internal combustion engine. It can be considered alternatively to use the control valves in vehicles with an electric motor, hybrid drive or hydrogen engine.

An ancillary aspect of the invention relates to an exhaust system for a motor vehicle, especially a motorbike, comprising a first exhaust pipe providing a first flow channel and a previously described control valve, wherein at least the shut-off body of the control valve is arranged in the first flow channel.

The exhaust system can comprise an inflow channel and one or several outflow channels. It can thus be provided that the control valve connects an inflow channel of the exhaust system with at least two outflow channels of the exhaust system, so that dividing the volumetric flow from the inflow channel to the outflow channels can be adjusted. The control valve can therefore not only be used for limiting the volumetric flow in a continuous exhaust pipe, but can also assume the function of dividing the volumetric flow from one single inflow channel into several outflow channels. The degree of the distribution of the volumetric flow can be set by the position of the shut-off body.

At least one second exhaust pipe which surrounds the first exhaust pipe is preferably provided. In particular, the first exhaust pipe can be arranged coaxially within the second exhaust pipe. The second exhaust pipe preferably surrounds the first exhaust pipe in such a way that an annular space is formed between the first exhaust pipe and the second exhaust pipe. The control valve can be arranged in such a way that at least one bypass channel of the valve housing is positioned in the annular space. The bypass channel can thus provide a fluidic connection between pipe sections of the second exhaust pipe. The shut-off body regulates the volumetric flow through the first exhaust pipe. The control valve can further produce a noise-damping effect by the bypass channels which are assigned to the second exhaust pipe.

In a preferred embodiment of the exhaust system in accordance with the invention, the first exhaust pipe comprises a connecting opening in the flow direction of the exhaust gas before and behind the control valve, which connecting opening connects the first flow channel, i.e. the flow channel of the first exhaust pipe, to the annular space. This provides an alternative flow path for the exhaust gas. The exhaust gas flowing through the first exhaust pipe can therefore be conducted via the connecting opening into the annular space between the first exhaust pipe and the second exhaust pipe and can thus be guided through the bypass channels of the valve housing. After passage through the bypass channel in the valve housing, the exhaust gas returns to the first exhaust pipe again via a further connecting opening.

The control valve is electronically controllable in an especially preferred embodiment. In particular, the control valve can be connected to a controller which predetermines a position of the shut-off body depending on the operating state data of the motor vehicle. As a result, the position of the shut-off body can especially be adjusted depending on the speed of the internal combustion engine. In order to retrieve the operating state data of the motor vehicle in an especially simple way, it is provided in a further preferred embodiment of the invention that the controller comprises a standardised interface, especially an OBD interface, for connection with the motor vehicle. This allows an especially simple detection of the operating state data of the motor vehicle.

The standardised interface preferably provides adequate electrical power for operation of the exhaust control. Specifically, the control valve can be actuated by a servomotor whose power supply occurs via the standardised interface, especially the OBD interface. The servomotor can be connected for this purpose indirectly via the controller to the interface.

The invention will be explained below in closer detail by reference to an embodiment shown in the enclosed schematic drawings, wherein.

The enclosed drawings show a control valve 10 for an exhaust system of a motor vehicle. The control valve 10 is preferably used in an exhaust system of a motorbike and allows changing the volumetric flow of the exhaust gases conducted through the exhaust pipe 20. Both the power of the motorbike and also the generation of noise can be influenced by a respective control of the control valve 10.

Figure 3:
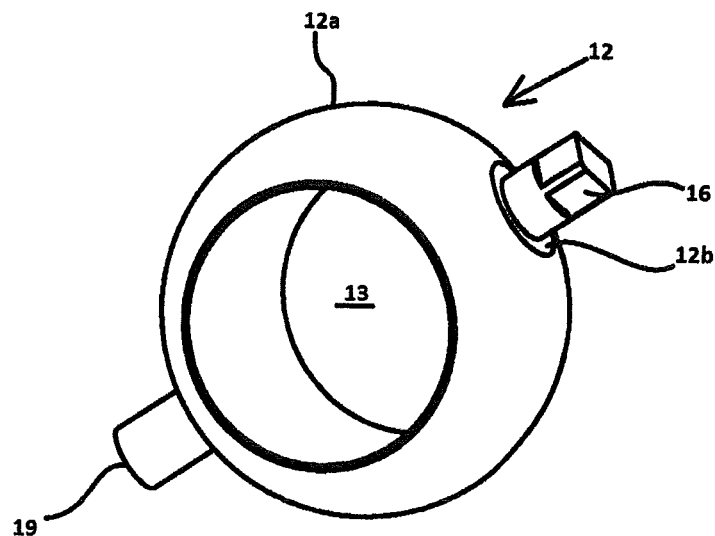
FIG. 3 shows a detailed view of the shut-off body of the control valve according to FIG. 1.

The control valve 10 generally comprises a valve housing 11 in which a shut-off body 12 is arranged. The shut-off body 12 is formed in the illustrated embodiment as a perforated ball 12a. The shut-off body 12 which is formed as a perforated ball 12a is shown in detail in FIG. 3.

The shut-off body 12 especially comprises a through bore 13, which substantially forms a cylindrical inner surface of the shut-off body 12. The through bore 13 is preferably dimensioned in such a way that its diameter corresponds to the diameter of an adjoining exhaust pipe 20. The outer surface of the shut-off body 12 is formed in a spherical manner or follows a spherical shape. As is further shown in FIG. 3, the shut-off body 12 comprises an actuating shaft 16, wherein the actuating shaft 16 is integrally formed with the shut-off body 12 or the perforated ball 12a. The actuating shaft 16 comprises a free end section in the illustrated embodiment, which end section has a polygonal, especially square, cross-sectional shape. In other words, the end section of the actuating shaft 16 has a square shape so that a respective actuating device can be connected in an interlocking manner to the actuating shaft 16. As is further shown in FIG. 3, a seal 12b rests on the outer surface of the shut-off body 12, which seal surrounds the actuating shaft 16. The seal 12b can substantially be formed by a curved washer.

A bearing pin 19 is arranged radially opposite the actuating shaft 16, wherein the bearing pin 19 has a cylindrical outer contour. The bearing pin 19 preferably engages in a similarly cylindrical depression or opening 17 in the valve housing and thus fixes the longitudinal axial position of the shut-off body 12 in the valve housing 11. The actuating shaft 16 preferably also extends through an opening 17 in the valve housing 11, wherein at least the free end section, which is formed as a square, protrudes from the valve housing 11 and is thus connectable to an actuating device.

Instead of the illustrated two-axis variant of the shut-off body 12 with a first actuating shaft 16 (first axis) and a bearing pin 19 (second axis), a single axis can generally be provided. In particular, the shut-off body 12 can exclusively comprise the actuating shaft 16 as the sole axis. In other words, the shut-off body 12 can be formed without the bearing pin 19.

Figure 1:
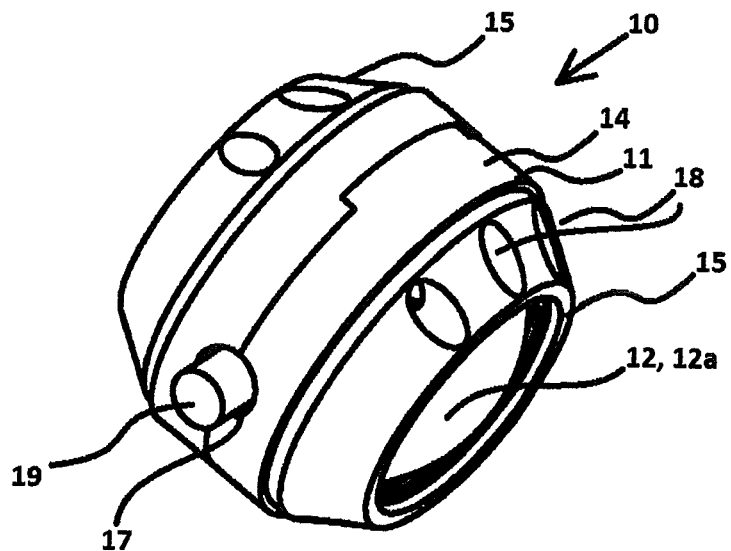
FIG. 1 shows a perspective total view of a control valve in accordance with the invention according to a preferred embodiment.

FIG. 1 shows the valve housing 11. The valve housing 11 comprises a cylindrical section 14 and two sections 15 formed in the manner of a truncated cone. The cylindrical section 14 is arranged between the two truncated-cone-shaped sections 15 and is rigidly connected thereto. The opening 17 is provided in the cylindrical section 14, through which the bearing pin 19 extends.

Figure 6:
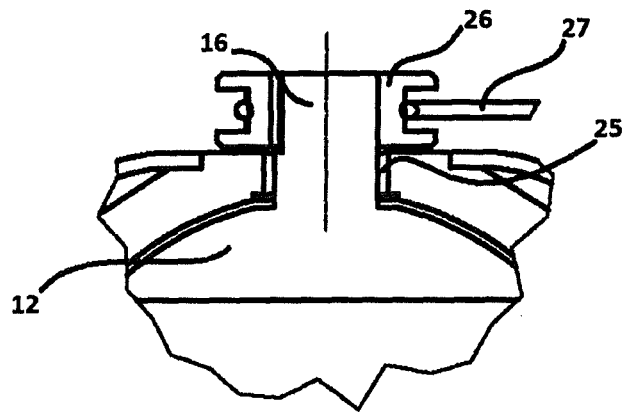
FIG. 6 shows a cross-sectional view of a detail of the control valve according to FIG. 1.
Figure 7:
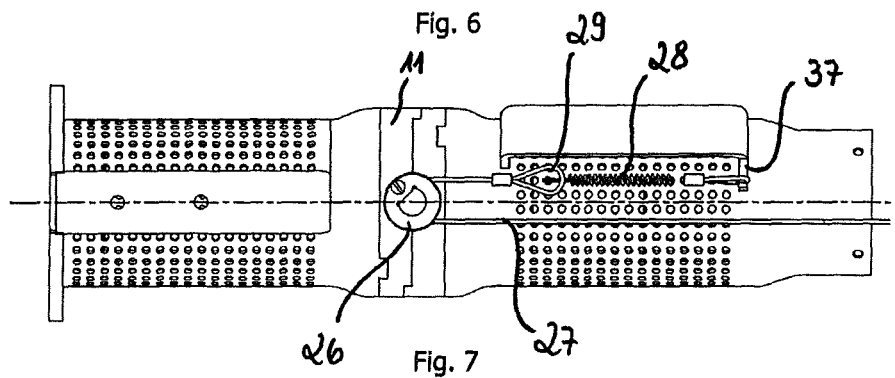
FIG. 7 shows a perspective view of an exhaust system with the control valve according to FIG. 1.

The shut-off body 12 is arranged in the valve housing 11 at the altitude of the cylindrical section 14. The shut-off body 12 protrudes partly into the truncated-cone-shaped sections 15 in the longitudinal axial direction. It is generally provided that the valve housing 11 has a substantially spherical inner surface so that the shut-off body 12 can be twisted very well in the valve housing 11. In order to prevent jamming of the shut-off body 12, it is further provided that there is expansion play between the valve housing 11 and the shut-off body 12. It can be set by the seal 12b for example. For example, the seal 12b can have a wall thickness of between 0.2 mm and 0.5 mm, so that when using two seals 12b on the actuating shaft 16 on the one hand and the bearing pin 19 on the other hand an expansion play of 0.5 mm to 1 mm is maintained. An expansion play of 0.5 mm is preferable, wherein the shut-off body 12 has a distance of 0.25 mm from the valve housing 11 or the bearing bushes 25, through which the bearing pin 19 or the actuating shaft 16 are guided. FIG. 6 shows a bearing bush 25 by way of example, which is formed as a flanged sleeve bearing. The bearing bush 25 extends through the valve housing 11 and accommodates the actuating shaft 16. The actuating shaft 16 is connected to a cable guide 26. The cable guide to 26 accommodates a cable, especially a wire cable 27, which is pretensioned on the one hand by a spring 28 and is connected on the other hand to a servomotor for the actuation of the control valve. The spring 28 engages for this purpose in a loop 29, which is formed integrally from a longitudinal end of the wire cable 27. The fixing of the spring 28 occurs via a hook 37, which is attached or fixed to the second exhaust pipe 30 (FIG. 7).

As is further shown in FIG. 1, the bypass channels 18 extend through the valve housing 11. The bypass channels 18 extend parallel to the longitudinal axial direction of the valve housing 11 or parallel to the direction of flow of a fluid flowing through the control valve 10. A total of six bypass channels 18 are especially provided, wherein three bypass channels 18 each form a group and the two groups of three bypass channels 18 each are arranged in a radially opposite manner. The function of the bypass channels 18 will be explained below in closer detail in the installed state by reference to FIG. 4.

Figure 2:
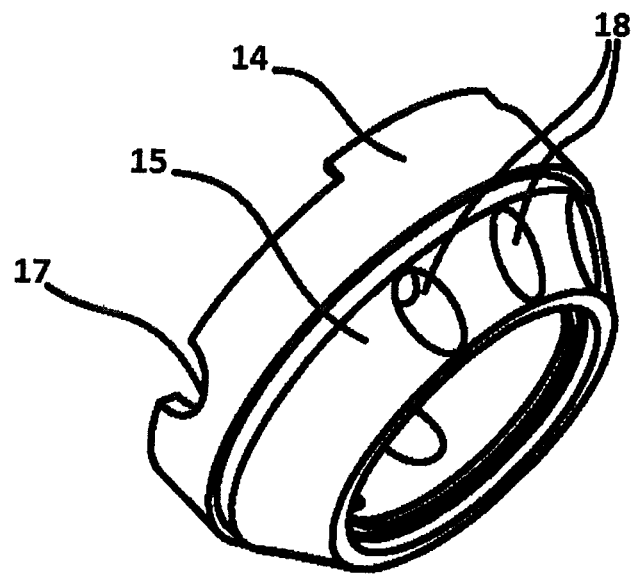
FIG. 2 shows a part of the valve housing of the control valve according to FIG. 1.

FIG. 2 shows a part or a half of the valve housing 11. The valve housing is preferably formed in several parts, especially in two parts. This facilitates mounting of the spherical shut-off body 12. For this purpose, the valve housing 11 is divided in the circumferential direction along the cylindrical section 14. The valve housing 11 is especially divided in such a way that the opening 17 is divided centrally both for the actuating shaft 16 and also for the bearing pin 19, so that each half of the valve housing 11 comprises two radially opposite, semicircular recesses, wherein the semicircular recesses, in the assembled state of the two halves of the valve housing 11, each form the openings 17 which are formed in a circular way. As a result, the shut-off body 12 with the actuating shaft 16 and the bearing pin 19 can simply be inserted into one half of the valve housing 11, and the valve housing 11 can then be completed by inserting the second half.

As is also shown in FIGS. 1 and 2, the truncated-cone-shaped sections 15 are formed in a tapering manner to the outside. This is used for reducing the material on the one hand because the valve housing 11 thus entirely follows the spherical shape of the shut-off body 12. On the other hand, it allows the truncated-cone-shaped formation of the longitudinal axial ends of the valve housing 11 and the simple and compact integration of the control valve 10 in an exhaust system.

Figure 4:
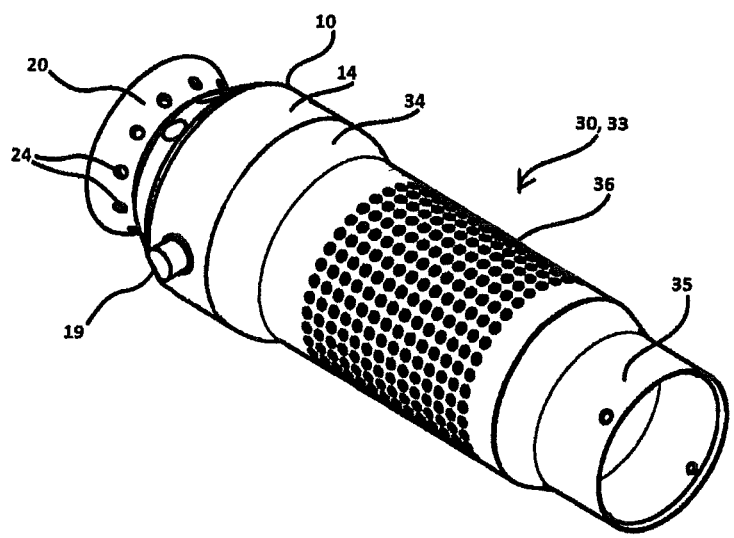
FIG. 4 shows a perspective view of a part of an exhaust system with the control valve according to FIG. 1.

FIG. 4 shows a part of an exhaust system which comprises two exhaust pipes 20, 30. A first exhaust pipe 20 is provided in particular, which is arranged coaxially within a second exhaust pipe 30. The second exhaust pipe 30 substantially forms a muffler. For this purpose, the second exhaust pipe 30 comprises a regular perforation extending over the entire circumference of the exhaust pipe 30. The first exhaust pipe 20 comprises an inflow channel 22, which is provided upstream of the control valve 10 in the direction of flow of the exhaust gas. The control valve 10 adjoins the inflow channel 22 directly. An outflow channel 23 of the first exhaust pipe 20 is provided downstream of the control valve 10 in the direction of flow. The outflow channel 23 is arranged coaxially within the second exhaust pipe 30.

The first exhaust pipe 20 forms a first floor channel 21 for exhaust gases. The first exhaust pipe 20 comprises connecting openings 24 before the control valve 10 and after the control valve 10 in the direction of flow of the exhaust gas. The connecting openings 24 extend radially through the exterior wall of the first exhaust pipe 20.

The connecting openings 24 connect the first flow channel 21 to a second flow channel 31 which is formed by the second exhaust pipe 30. It is specifically provided that as a result of the coaxial arrangement of the first exhaust pipe 20 within the second exhaust pipe 30 an annular space 32 is created, which is bounded on the one hand by the second exhaust pipe 30 and on the other hand by the first exhaust pipe 20. The connecting openings 24 in the first exhaust pipe 20 thus connect the first floor channel 21 to the annular space 32, which forms the second flow channel 31 of the second exhaust pipe 30.

The second exhaust pipe 30 is formed in its entirety in an integral manner and comprises a connection piece 34 at its longitudinal axial end which faces the control valve 10. The connection piece 34 has a cross-sectional diameter which is greater than the cross-sectional diameter of a perforated middle section 36 of the second exhaust pipe 30. The connection piece 34 is especially dimensioned in such a way that it surrounds a truncated-cone-shaped section 15 of the control valve 10 or the valve housing 11 and is flush with said section. An end pipe 35 is provided at a longitudinally axially opposite end of the second exhaust pipe 30, which end pipe directly adjoins the perforated middle section 36 and has a cross-sectional diameter which is smaller than the cross-sectional diameter of the perforated middle section 36.

Figure 5:
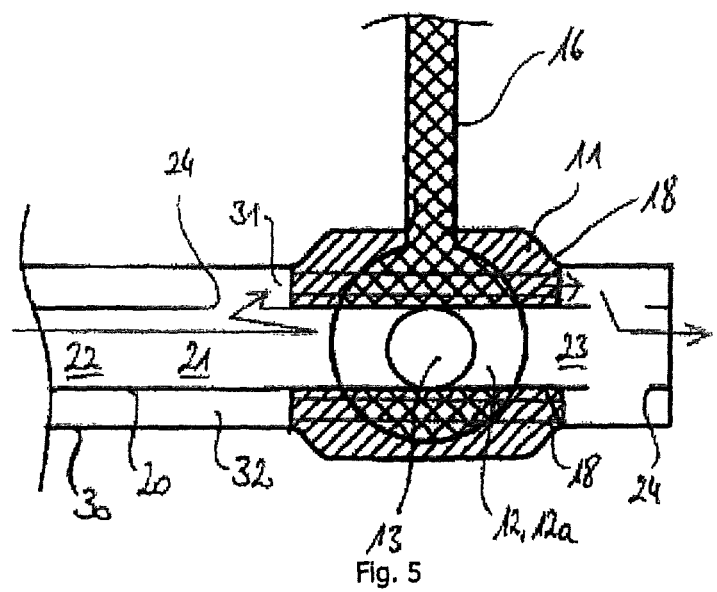
FIG. 5 shows a cross-sectional view through a part of an exhaust system with the control valve according to FIG. 1.

FIG. 5 shows the control valve in the installed state in an exhaust system, wherein the flow path of the exhaust gases is especially shown in the cross-sectional view according to FIG. 5. The illustration clearly shows the valve housing 11 surrounds the shut-off body 12. The shut-off body 12 is formed as a perforated ball 12a, wherein the shut-off body 12 assumes the completely closed position in the illustration according to FIG. 5. The through bore 13 is twisted out of the first flow channel 21 so that no exhaust gases or only a small portion of the exhaust gas flow is conducted through the through bore 13. The control valve 10 is arranged between two pipe sections, wherein each pipe section is formed by a first exhaust pipe 20 and a second exhaust pipe 30 which surrounds the first exhaust pipe 20 coaxially. An annular space 32 is formed between the first exhaust pipe 20 and the second exhaust pipe 30, which annular space is fluid-connected to the bypass channels 18 in the valve housing 11. In other words, the bypass channels 18 of the valve housing 11 connect the annular spaces 32 of the second exhaust pipe 30 on both sides of the control valve 10. The bypass channels 18 thus form a second flow channel 31 with the second exhaust pipe 30 or the annular space 32.

Radial connecting openings 24 are provided in the first exhaust pipe 20, so that the exhaust gas, in the closed state of the shut-off body 12, is introduced via the connecting openings 24 into the annular space 32. The exhaust gas can pass through the valve housing 11 via the bypass channels 18 and can subsequently return to the first flow channel 21 via connecting openings 24, which are arranged between the first exhaust pipe 20 and the second exhaust pipe 30 in a pipe section downstream of the control valve 10 in the direction of flow. The progression of the flow of the exhaust gas is shown in FIG. 5 by respective arrows.

It is generally provided that the control valve 10 is arranged in such a way that it can shut off a flow path for exhaust gases in an exhaust system either in part or in full. It is not only possible to use the control valve for flow paths of exhaust gases, but also in flow paths for fuels, operating supplies, intake air, conditioning air or coolant. The control valve can be used not only as a shut-off or throttle valve. It is also possible to divide a fluid flow from an inflow channel 22 among one or several outflow channels 23. It can be recognised in the embodiment according to FIG. 5 that only one single inflow channel through the first exhaust pipe 20 is formed. The exhaust gas is conducted into the sole outflow channel 22 of the first exhaust pipe 20 by opening the shut-off body 12, i.e. by rotation of the shut-off body 12. It is alternatively possible to provide several outflow channels 23 after the control valve 10, so that a distribution of the exhaust gas to several outflow channels 23 is enabled by the rotation of the shut-off body 12.

It is provided in the illustrated embodiment that the flow channel 21, 31 is respectively formed in a tubular manner with a substantially circular-cylindrical inner contour. It is also possible that the flow channel has a different cross-sectional geometry, e.g. a polygonal cross-sectional geometry.

The control of the control valve 10 or the rotation of the shut-off body 12 can occur mechanically or manually. It is also possible to set the position of the shut-off body 12 by an electronically controlled controlling device. The electronically controlled controlling device can use different operating state data of the motor vehicle such as travelling velocity, engine speed and/or engaged transmission gears as operating state data for the calculation of the optimal opening degree of the control valve 10. The control valve 10 can thus be controlled dynamically. The aforementioned operating state data are preferably retrieved by a central interface on the vehicle. Such interfaces are diagnostic plugs, standardised data transmission interfaces and/or OBD plugs for example. The use of such a standardised data interface allows easily retrofitting the control valve 10 in existing vehicles.

If no data for identifying the engaged transmission gear of the motor vehicle are available, the control of the control valve 10 can also occur on the basis of data which determine the travelling speed and the engine speed. These data allow drawing conclusions on the engaged transmission gear and thus also allow the dynamic control of the control valve 10.

LIST OF REFERENCE NUMERALS

10 Control valve
11 Valve housing
12 Shut-off body
12a Perforated ball
12b Seal
13 Through bore
14 Cylindrical section
15 Section shaped in the manner of a truncated cone
16 Actuating shaft
17 Opening
18 Bypass channel
19 Bearing pin
20 First exhaust pipe
21 First flow channel
22 Inflow channel
23 Outflow channel
24 Connecting opening
25 Bearing bush
26 Cable guide
27 Wire cable
28 Spring
29 Loop
30 Second exhaust pipe
31 Second flow channel
32 Annular space
33 Muffler
34 Connection piece
35 End pipe
36 Perforated middle section
37 Hook

I claim:

1. An exhaust system for a motor vehicle comprising a first exhaust pipe (20) which provides a first flow channel (21), and a control valve (10) comprising a valve housing (11) in which a shut-off body (12) is movably arranged for changing the cross-section of a flow channel (21) of the exhaust system, wherein expansion play in the radial and axial direction is provided between the shut-off body (12) and the valve housing (11), which allows thermal expansion of the shut-off body (12) within the valve housing (11), and the shut-off body (12) comprises a perforated ball (12a) wherein at least the shut-off body (12) is arranged in the first flow channel (21), and at least one second exhaust pipe (13) is provided which surrounds the first exhaust pipe (20) so that an annular space (32) is formed between the first exhaust pipe (20) and the second exhaust pipe (30), wherein the control valve (10) is arranged in such a way that at least one bypass channel (18) of the valve housing (11) is positioned in the annular space (32).

2. An exhaust system for a motor vehicle according to claim 1 wherein the valve housing (11) is formed in several parts.

3. An exhaust system for a motor vehicle according to claim 1 wherein the valve housing (11) and/or the shut-off body (12) comprises a hollow material or is formed therefrom.

4. An exhaust system for a motor vehicle according to claim 1 wherein the valve housing (11) comprises a middle cylindrical section (14) and two adjoining sections (15) formed in the manner of a truncated cone.

5. An exhaust system for a motor vehicle according to claim 1 wherein the shut-off body (12) is connected to an actuating shaft (16) or is integrally formed therewith, said actuating shaft extending through an opening (17) in the valve housing (11) to the outside.

6. An exhaust system for a motor vehicle according to claim 5 wherein the opening (17) is arranged in a cylindrical section (14) of the valve housing (11).

7. An exhaust system for a motor vehicle according to claim 5 wherein the actuating shaft (16) and the shut-off body (12) comprise materials that differ from each other.

8. An exhaust system for a motor vehicle according to claim 1 wherein the valve housing (11) comprises at least one bypass channel (18).

9. An exhaust system for a motor vehicle according to claim 1 wherein at least one seal is a metallic seal, and is arranged between the valve housing (11) and the shut-off body (12).

10. An exhaust system for a motor vehicle according to claim 1 wherein the shut-off body (12) is arranged in a floating manner in the valve housing (11) spaced on all sides from the valve housing (11).

11. An exhaust system for a motor vehicle according to claim 1 wherein the valve housing (11) comprises at least one bearing for the shut-off body (12) and/or the actuating shaft (16).

12. An exhaust system for a motor vehicle according to claim 1 further comprising a limit stop for limiting a rotational movement of the shut-off body (12).

13. An exhaust system for a motor vehicle according to according to claim 1 further comprising at least one spring element which acts on a rotational movement and/or a longitudinal axial displacement movement of the shut-off body (12) in the direction of flow so that the shut-off body (12) can be returned to a predetermined starting position.

14. An exhaust system according to claim 1 wherein the control valve (10) connects an inflow channel (22) to at least one outflow channel (23) so that a division of the volumetric flow from the inflow channel (22) into the outflow channels (23) is adjustable.

15. An exhaust system according to claim 1 wherein the first exhaust pipe (20), in the direction of flow of the exhaust gas, comprises a connecting opening (24) before and after the control valve (10), said connecting opening connecting the first flow channel (21) of the first exhaust pipe (20) to an annular space (32).

16. An exhaust system according to claim 1 wherein the control valve (10) is electronically controllable.

17. An exhaust system according to claim 1 wherein the control valve (10) is connected to a controller which predetermines the position of the shut-off body (12) depending on operating state data of the motor vehicle.

18. An exhaust system according to claim 17 wherein the controller comprises a standardised interface for connection with the motor vehicle.

19. An exhaust system according to claim 18 wherein the control valve (10) can be actuated by a servomotor, wherein the power supply of the servomotor occurs via the standardised interface.

* * * * *